(12) United States Patent
Kim et al.

(10) Patent No.: US 9,005,756 B2
(45) Date of Patent: Apr. 14, 2015

(54) BLOCK COPOLYMER NANOSTRUCTURE FORMED ON SURFACE PATTERN WITH SHAPE DIFFERENT FROM NANOSTRUCTURE OF THE BLOCK COPOLYMER AND METHOD FOR PREPARATION THEREOF

(75) Inventors: Sang Ouk Kim, Daejeon (KR); Dong Ok Shin, Daejeon (KR); Bong Hoon Kim, Daejeon (KR)

(73) Assignee: Advanced Institute of Science and Technology, Daejeon (KR)

( * ) Notice: Subject to any disclaimer, the term of this patent is extended or adjusted under 35 U.S.C. 154(b) by 1810 days.

(21) Appl. No.: 12/081,172

(22) Filed: Apr. 11, 2008

(65) Prior Publication Data

US 2009/0075002 A1  Mar. 19, 2009

(30) Foreign Application Priority Data

Sep. 14, 2007  (KR) .................. 10-2007-0093708

(51) Int. Cl.
| | | |
|---|---|---|
| B32B 19/00 | (2006.01) | |
| B32B 15/02 | (2006.01) | |
| B05D 5/00 | (2006.01) | |
| C23F 1/00 | (2006.01) | |
| B05D 1/18 | (2006.01) | |
| B05D 3/02 | (2006.01) | |
| B82Y 30/00 | (2011.01) | |
| B82Y 40/00 | (2011.01) | |

(52) U.S. Cl.
CPC *B05D 5/00* (2013.01); *B05D 1/185* (2013.01); *B05D 3/0254* (2013.01); *B82Y 30/00* (2013.01); *B82Y 40/00* (2013.01); *Y10S 977/773* (2013.01)

(58) Field of Classification Search
CPC . C08L 53/00; C08L 2666/24; B81C 1/00031; B81C 2201/0149; B82Y 10/00
USPC .................. 428/357, 364, 401, 402; 977/773; 427/256, 261, 264; 216/39
See application file for complete search history.

(56) References Cited

U.S. PATENT DOCUMENTS

2008/0299353 A1* 12/2008 Stoykovich et al. ....... 428/195.1

OTHER PUBLICATIONS

Park et al., "Enabling nanotechnology with self assembled block copolymer patterns," Polymer 44 (2003) p. 6725-6760, published online Sep. 16, 2003.*
Edwards et al., "Dimensions and Shapes of Block Copolymer Domains Assebled on Lithographically Defined Chemically Patterned Substrates," Macromolecules, 2007, 40, 90-96. Published online Dec. 14, 2006.*
Kim, Sang Ouk, "Epitaxial Self-Assembly of Block Copolymers for Next Generation Nanofabrication", *Journal, The Polymer Society of Korea*, Publication Date: Apr. 12, 2007, pp. 20-21.
La, Young-Hye, et al., "Directed Assembly of Cylinder-Forming Block Copolymer Films and Thermochemically Induced Cylinder to Sphere Transition: A Hierarchical Route to Linear Arrays of Nanodots", *Nano Letters*, vol. 5, No. 7, pp. 1379-1384, (2005).

(Continued)

*Primary Examiner* — Matthew Matzek
(74) *Attorney, Agent, or Firm* — Nath, Goldberg & Meyer; Tanya E. Harkins

(57) ABSTRACT

Disclosed are block copolymer nanostructures formed on surface patterns different from nanostructure of the block copolymer and preparation methods thereof.

24 Claims, 9 Drawing Sheets

(56) References Cited

OTHER PUBLICATIONS

Kim, Sang Ouk, et al., "Epitaxial self-assembly of block copolymers on lithographically defined nanopatterned substrates", *Nature*, vol. 424, pp. 411-414, (2003).

Stoykovich, Mark P., et al., "Directed Assembly of Block Copolymer Blends into Nonregular Device-Oriented Structures", *Science*, vol. 308, pp. 1442-1446, (2005).

\* cited by examiner

Ls = 100nm
Lo = 45nm
D = 40nm

Ls = 100nm
Lo = 45nm
D = 40nm

Ls = 100nm
Lo = 48nm
D = 110nm

Ls = 300nm
Lo = 48nm
D = 38nm

Ls = 300nm
Lo = 48nm
D = 67nm

Ls = 300nm
Lo = 48nm
D = 111nm

Ls = 300~400nm
Lo = 48nm
D = 111nm

Ls = 300~400nm
Lo = 48nm
D = 111nm

Ls = 300~400nm
Lo = 48nm
D = 111nm

Ls = 500nm
Lo = 48nm
D = 100nm

Ls = 45nm
Lo = 45nm
D = 40nm

BLOCK COPOLYMER NANOSTRUCTURE FORMED ON SURFACE PATTERN WITH SHAPE DIFFERENT FROM NANOSTRUCTURE OF THE BLOCK COPOLYMER AND METHOD FOR PREPARATION THEREOF

BACKGROUND OF THE INVENTION

This application claims priority to Korean Patent Application No. 2007-0093708, filed on Sep. 14, 2007, in the Korean Intellectual Property Office, the entire contents of which are hereby incorporated by reference.

FIELD OF THE INVENTION

The present invention relates to block copolymer nanostructures formed on surface patterns different from nanostructure of the block copolymer and preparation methods thereof, more particularly, to a block copolymer nanostructure prepared by forming a block copolymer thin film on a patterned substrate having a pattern cycle not coincident with a periodic cycle of a block copolymer and heat treating the substrate having the thin film, in addition to, a method for preparation thereof.

DESCRIPTION OF THE RELATED ART

"Self-assembly" means a phenomenon in which any reaction happens spontaneously or voluntarily between molecules without artificial operations. Such self-assembly phenomenon is often revealed in nature as a base for every living organism and living organisms can be regarded as the ultimate product of the self-assembly phenomenon. At present, all over the world nanostructures are physically and chemically produced on the basis of self-assembly phenomena. Studies and investigations are being increasingly executed to reproduce processes for production of nanostructures and attempts to apply the reproduced processes for preparation of nanostructures to academic and/or commercial uses, recently draw much attention.

The self-assembly phenomena can be found in block copolymers possibly synthesized in a scale of a molecular unit by known methods in organic chemistry.

A block copolymer has specific molecular structure in that polymeric blocks with different chemical structures are combined together by covalent bonds. Separate blocks in a molecule tend to phase separate but the phase separation is restricted by covalent bonds. Accordingly, if there is a micro-phase separation, a nanostructure comprising spheres, cylinders, lamella, etc. in periodic alignment is obtained. In this case, the nanostructure has a wider domain dimension in the range from 5 to 100 nm and can be manufactured in a variety of forms.

The nanostructure composed of block copolymers has thermo-dynamic stability sufficient to form the nanostructure spontaneously and, shapes and/or sizes of desired nanostructures can be controlled by regulating molecular weight and relative compositional ratio of each of the blocks. In particular, nanostructures comprising block copolymers (hereinafter, referred to as "block copolymer nanostructure" or "nanostructure") are formed in parallel so as to show excellent ability for mass production thereof. Such formation of nanostructures is extensively studied as a major technique to form nano-scaled structures by combining this method with conventional top-down methods.

Indeed, in order to utilize a block copolymer nanostructure, it is important to form a block copolymer thin film on the substrate, then control the block copolymer to have a desired form of nanostructure. However, naturally formed block copolymer nanostructures have several defects including irregular orientations and, in order to overcome these problems, there was recently an attempt to combine a top-down method with a bottom-up method so as to embody a completely controlled block copolymer nanostructure with a large area.

In order to completely align the block copolymer nanostructure formed by self-assembly, techniques for combination of top-down and bottom-up methods are used. The representative examples of the combination techniques are generally classified into graphoepitaxy and epitaxial self-assembly methods based on characteristics of top-down patterns.

"Graphoepitaxy method" is a method to form a block copolymer nanostructure having long range order by use of a micro-pattern on a surface of a substrate and, in particular, by forming a micro or sub-micro pattern on a surface of the substrate by general lithographic processes, forming a block copolymer thin film, and controlling orientation of a block copolymer nanostructure which is formed by self-assembly. The formed pattern comprises uneven relief parts of the substrate and the nanostructure has long range order which starts from an edge of the pattern to substantially entire portion of the block copolymer thin film. However, a wider distance between adjacent patterns may cause defects in parts where the boundary effect is not influenced by an edge of the pattern. Alternatively, another reason for appearance of defects is the edge of the pattern is not entirely clean to a molecular level. Accordingly, the above method has a problem of restricted applications.

Meanwhile, "epitaxial self-assembly method" is a representative method for formation of a block copolymer nanostructure comprising desired alignment in a large area (that is, long range order) by self-assembly, characterized in that it forms a surface pattern having a pattern cycle substantially coincident with a periodic cycle of block polymer and controls the nanostructure using the surface pattern. More particularly, this method comprises: forming a chemical pattern, which has a pattern cycle substantially coincident with a periodic cycle of a block copolymer in equilibrium state, on an organic monolayer of a substrate using lithographic techniques of a conventional top-down method; and forming a block copolymer thin film thereon, so as to produce a completely ordered nanostructure. Such epitaxial self-assembly method has solved a difficult problem which has arisen from known studies, in that self-assembly materials are aligned and controlled in a restricted area. This method proposed a potential use of ordered nanostructures in industrial manufacturing of devices such as for mass production of semiconductors, however, it has a limitation such that a micro-fine pattern having a cycle corresponding to a periodic cycle of a block copolymer must be stably formed by a commonly known top-down method to obtain a chemical surface pattern having a cycle coincident with the periodic cycle of the block copolymer, as a result the conventional method revealed difficulties in the production of devices.

Recently, there have been proposed nanostructures potentially used in super-high density magnetic storage media, for example, produced by a process comprising: forming an image layer in polymeric form on a silicon wafer; preparing a chemical pattern having a cycle of about 55 nm by means of Extreme Ultraviolet-Interference Lithography (abbrev. to EUVIL); forming a nanostructure in a cylinder form by PS-b-

PtBA self-assembly through heat treatment on the prepared pattern; and further heat treating the nanostructure to induce a stepped alignment of polyanhydride (PAA) nano-dots in the nanostructure, so as to produce a desired nanostructure. But, this method requires the heat treatment twice to obtain the desired nanostructure and the final nanostructure in a sphere form cannot have high aspect ratio, so that there are limitations for use in a wide range of industrial applications (see La, Y. H. et al., Nano Letters 5, 1379:1378, 2005).

The present inventors have developed a block copolymer nanostructure with completely controlled form depending on nano pattern, produced by: forming an organic monolayer as an image layer on a silicon wafer; forming top-down pattern on the image layer by EUVIL; forming a chemical surface pattern on the layer by X-ray irradiation; and preparing a block copolymer thin film to produce a block copolymer nanostructure having controlled form dependent on the formed nano pattern by self-assembly. Such developed nanostructure is important as the first findings in researches in regard to complete control of materials for self-assembly without defects, however, it has a disadvantage in that the form of the block copolymer nanostructure can be completely controlled only when the chemical surface pattern of the nanostructure has a cycle coincident with a periodic cycle of a block copolymer (see Kim, S. O. et al., Nature 424, 411, 2003).

Moreover, the present inventors found that there is a possibility of aligning lamella type block copolymer even on various irregular patterns as well as simple linear patterns. However, this finding also has a limitation in technical construction since the above result is embodied only if a variety of patterns have cycles substantially coincident with a periodic cycle of the block copolymer. In other words, in order to make a cycle of pattern to be coincident with a cycle of a block copolymer, there is a requirement of a novel process that introduces EUVIL to prepare a resist pattern having a cycle coincident with a periodic cycle of a lamella type block copolymer and that transfers the resist pattern on an organic monolayer of a substrate by X-ray irradiation (see Kim, S. O. et al., Science 308, 1442, 2005).

SUMMARY OF THE INVENTION

Accordingly, as a result of great efforts to solve problems of conventional techniques as described above, the present inventors found that a nanostructure can be formed on a substrate by forming a block copolymer thin film on a patterned substrate, which has a pattern cycle not coincident with a periodic cycle of a block copolymer, and heat treating the substrate without making the pattern cycle to be coincident with the periodic cycle of the block copolymer; therefore, the present invention was completed based on the above fact.

An object of the present invention is to provide a block copolymer nanostructure formed on surface pattern not coincident with a nanostructure of the block copolymer.

Another object of the present invention is to provide a method for preparation of a block copolymer nanostructure.

In order to achieve the above objects, the present invention provides a method comprising the steps of: (a) forming a neutral layer on a substrate; (b) patterning the substrate having the neutral layer such that the patterned substrate has a pattern cycle not coincident with a periodic cycle of a block copolymer; (c) forming a block copolymer thin film on the patterned substrate; and (d) heat treating the block copolymer to induce self-assembly thereof, so as to produce a completed nanostructure.

The present invention further provides a cylinder type nanostructure comprising a block copolymer thin film on a patterned substrate having a neutral surface and an optional surface.

The present invention also provides a lamella type nanostructure comprising a block copolymer thin film on a patterned substrate having a neutral surface and an optional surface.

The present invention also provides a sphere type nanostructure comprising a block copolymer thin film on a patterned substrate having a neutral surface and an optional surface.

The present invention also provides a gyroid type nanostructure comprising a block copolymer thin film on a patterned substrate having a neutral surface and an optional surface.

BRIEF DESCRIPTION OF THE DRAWINGS

These and other objects, features, aspects, and advantages of the present invention will be more fully described in the following detailed description of preferred embodiments and examples, taken in conjunction with the accompanying drawings. In the drawings.

DETAILED DESCRIPTION OF THE INVENTION

In an aspect of the present invention, there is provided a method for preparation of a block copolymer nanostructure comprising the steps of: (a) forming a neutral layer on a substrate; (b) patterning the substrate having the neutral layer such that the patterned substrate has a pattern cycle not coincident with a periodic cycle of a block copolymer; (c) forming a block copolymer thin film on the patterned substrate; and (d) heat treating the block copolymer to induce self-assembly thereof, so as to produce a completed nanostructure.

The present invention primarily provides a block copolymer nanostructure formed on surface pattern not coincident with a nanostructure of the block copolymer and a method for preparation thereof.

Herein, "not coincident with" means that a cycle of the surface pattern on a substrate is not substantially consistent with a periodic cycle of a block copolymer formed on the surface pattern.

Figure 2:
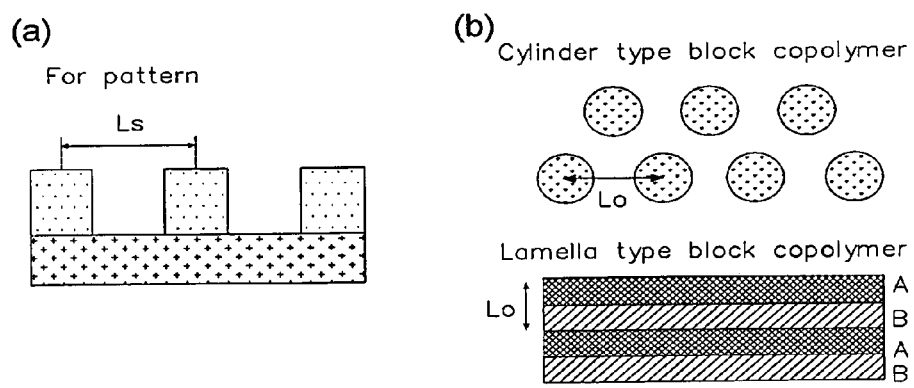
FIG. 2 is schematic views illustrating "pattern cycle" and "periodic cycle of block copolymer" defined in the present invention.

Herein, "pattern cycle (LS)" indicates, for example, a distance between the most adjacent peaks for a linear pattern (FIG. 2(a)). "Periodic cycle of block copolymer" means a distance between repetitive structures and, more particularly, a distance between centers of cylinders for a cylinder type block copolymer or thickness of a AB layer in case where the block copolymer is a lamella type block copolymer in a planar form of ABABAB (FIG. 2(b)). Briefly, the cycle described in the present invention is defined as the nearest-neighbor distance between periodically repetitive structures.

The substrate used in the present invention to prepare the block copolymer nanostructure is a silicon substrate, but, may comprise any substrates so far as the substrate can induce a self-assembly nanostructure without limitation thereto. Examples of the substrate include oxide substrates comprising conductive oxides and non-conductive oxides, metal substrates, etc.

Among commonly used means to control orientation of the block copolymer nanostructure, there is a method for formation of a block copolymer nanostructure that comprises the steps of treating a surface of a substrate to form a neutral surface which has the same chemical preference for two components in a block copolymer, and forming the block copolymer nanostructure on the neutral surface. Herein, "neutral" means that all of components in the block copolymer have the same surface tension to the surface of the substrate.

If each of components in a two-component based block copolymer has different surface tension to a surface of a substrate, the component with lower surface tension is positioned on interface between the block copolymer and the substrate to form a nanostructure oriented in parallel to the substrate. However, if the surface of the substrate is a neutral surface, both of components in the above two-component based block copolymer have the same surface tension to the neutral surface so that chemical energy at interface between the block copolymer and the substrate is substantially the same even when either of the components is located on the interface. Herein, orientation of the nanostructure is determined by "hard surface effect" of the substrate surface, which means a state such that chains of the block copolymer aligned in anisotropic form by micro-phase separation are oriented in parallel to a plane side.

According to an embodiment of the present invention, a thermally stable nanostructure can be produced by forming a neutral layer on a substrate, as a neutral surface, and controlling orientation of the nanostructure. Especially, a block copolymer nanostructure perpendicular to a substrate is preferably embodied by using a neutral layer as described above.

According to the present invention, the neutral layer may include an organic monolayer, and the organic monolayer may be a self-assembly monolayer or a polymer brush layer.

According to the present invention, the self-assembly monolayer may include any one selected from a group consisting of: phenethyltrichlorosilane (PETCS); phenyltrichlorosilane (PTCS); benzyltrichlorosilane (BZTCS); tolyltrichlorosilane (TTCS); 2-[(trimethoxysilyl)ethyl]-2-pyridine (PYRTMS); 4-biphenylyltrimethoxysilane (BPTMS); octadecyltrichlorosilane (OTS); 1-naphthyltrimethoxysilane (NAPTMS); 1-[(trimethoxysilyl)methyl]-naphthalene (MNATMS); and (9-methylanthracenyl)trimethoxysilane (MANTMS).

Alternatively, the present invention can produce a self-assembly monolayer on a substrate by immersing the substrate in an organic solution after performing a cleaning process on the substrate and can determine whether the self-assembly monolayer has been generated by maintaining a uniform contact angle or placing a block copolymer thin film on the produced self-assembly monolayer.

According to the present invention, the polymer brush layer may be a polystyrene-random-methyl methacrylate(PS-r-PMMA) brush layer.

Preferably, a polystyrene-random-poly(methyl methacrylate) copolymer (PS-r-PMMA) brush used in the present invention is synthesized by conventional free radical polymerization. In particular, a polymer brush layer is formed by mixing a free radical initiator, monomer and CTA (chain transfer agent) together, synthesizing a polymer brush from the mixture by bulk polymerization, and heat treating the polymer brush on a substrate.

When the polymer brush is used as a neutral layer, the present invention can effectively control surface energy of the substrate, which is significant to embody a block copolymer nanostructure perpendicular to the substrate.

According to an embodiment of the present invention, the patterning of the substrate having the neutral layer described above can be performed by a lithographic technique of top-down method (hereinafter, referred to as "top-down mode lithography").

One of principal concepts of the present invention is that epitaxial self-assembly of a polymer thin film is induced using a pattern formed by top-down mode lithography. The epitaxial self-assembly method is a method to embody a completely ordered nanostructure in desired form on a large area, that is, a nanostructure having long range order, by self-assembly.

In order to obtain a patterned substrate having a neutral layer, a micro-pattern in nano scale is primarily formed on the substrate by either of EUVIL as next generation lithography (NGL), or electron-beam lithography. Following the above, sequential processes including a development process and a pattern transfer process by etching are adopted to form a chemical surface pattern on the substrate so as to produce the patterned substrate. Such etching based pattern transfer process is based on a principle that portions of the substrate, which were protected against the etching due to the resist residue remaining on the substrate after the development process, are not chemically modified.

EUVIL using extreme UV rays as a light source can extend optical wavelength to about 0 to 14 nm by conventional optical lithography, and provide high resolution and large DOF (depth of focus) by using small NA (numerical aperture) and short wavelength. Since light in EUV region is generally absorbed in most of materials as well as air, the light cannot be used with conventional transmission type masks and/or optics but needs reflective masks and/or optics. Accordingly, EUVIL may be practically embodied by combining a common lithography which entraps EUV generated from a light source through a mirror, aligns the entrapped EUV, passes the aligned EUV through pattern of a mask, and executes reduction projecting of the patterned light to a wafer through projection optics, with constructional elements such as reflective optics and masks, EUV light source, resist and/or wafer stage.

Unlike conventional photo-lithographic apparatuses that expose photo-sensitive materials such as photoresist through photo-masks, an apparatus to embody the electron beam lithography is used to form a pattern in nanometer size without additional mask, which is characterized by accelerating electron beam emitted from a cathode to several tens of kV and precisely collecting the emitted electron beam through use of a magnetic field.

A development process used in the present invention is substantially identical to ones commonly used in developing photoresist. In other word, a pattern is formed by dissolving portions of a photoresist exposed to electron beam in a developing solution and allowing unexposed portions of the photoresist to remain. The developing solution is selected based on kinds of the photoresist used and, preferably, the present invention uses PMMA resist and a developing solution comprising methylisobutylketone (MIBK) and isopropyl alcohol (IPA) in a ratio by volume of 1:3.

A pattern transfer process by etching is a process to transfer photoresist pattern to a substrate without modification thereof wherein the photoresist pattern is formed on the substrate, to which a neutral layer is applied by EUVIL or electron beam lithography. More particularly, the pattern transfer process comprises the steps of: selectively removing unprotected portions by high flux X-ray irradiation under oxygen atmosphere and/or using chemically reactive plasma under high vacuum conditions wherein plasma is generated by energy of an electromagnetic field under high vacuum conditions; and impacting high energy ions from the plasma to a surface of a substrate and removing photoresist residue on the substrate by a stripper, so that a desired substrate having only chemical surface pattern without topographic pattern can be produced.

With regard to the present invention, the substrate with patterned surface by the above processes may have a neutral surface and an optional surface.

The neutral surface of the substrate in the present invention means a surface having equal chemical energy value with regard to two or more materials which exist on the neutral surface while the optional surface is a surface having different chemical energy values with regard to these materials, that is, a surface with higher preference to one of the materials.

Figure 1:
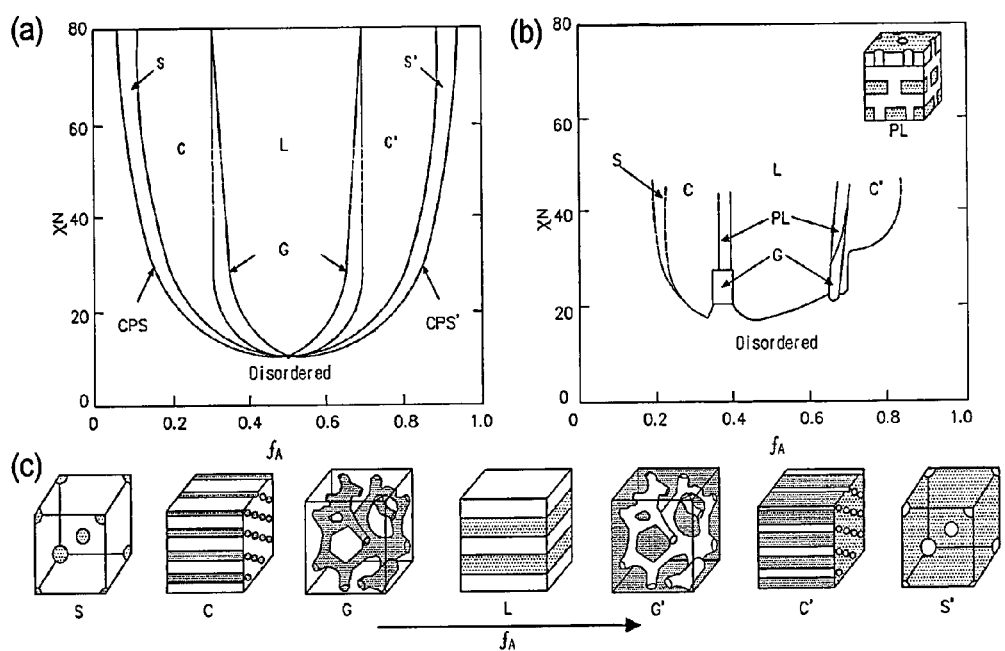
FIG. 1 illustrates a variety of block copolymer nanostructures with different forms, which are formed depending on relative ratios of respective blocks.

In order to induce a self-assembly type nanostructure, the present invention preferably uses a block copolymer having two polymer chains linked together. Such block copolymer shows different forms of nanostructures depending on relative ratio of the polymer chains. For example, when the partial ratio of one (A) of the polymer chains (A and B) is $0<A\leq0.23$, the nanostructure is obtained in a form of body centered cubic sphere surrounded by B block matrix. With the partial ratio of $0.23<A\leq0.35$, a nano domain forming the sphere part becomes a cylindrical nanostructure with hexagonal lattice. If A increases to $0.35<A\leq0.40$, a gyroid type nanostructure which comprises continuously linked cylinders in pairs is obtained. Lastly, for A with the partial ratio of about 0.5 (i.e. $A\approx0.5$), a lamella type nanostructure is formed (as shown in FIG. 1).

According to the present invention, a relative ratio of polystyrene to other polymer excluding polystyrene in the block copolymer may be defined by (0.70-0.65):(0.30-0.35) or (0.30-0.35):(0.70-0.65). In an embodiment of the present invention, the relative ratio of polystyrene to other polymer excluding polystyrene in the block copolymer can be defined by 0.5:0.5. In another embodiment of the present invention, the relative ratio of polystyrene to other polymer excluding polystyrene in the block copolymer can be defined by (0.82-0.77):(0.18-0.23) or (0.18-0.23):(0.82-0.77). In another embodiment of the present invention, the relative ratio of polystyrene to other polymer excluding polystyrene in the block copolymer can be defined by (0.65-0.60):(0.35-0.40) or (0.35-0.40):(0.65-0.60).

With regard to the nanostructure prepared by self-assembly of a block copolymer, the present invention has advantages in that: a pattern is formed by alignment in a scale of a molecular unit so as to form a pattern with extremely high pattern precision of less than several nanometers; the nanostructure has thermal stability so as to form a pattern with higher aspect ratio; and formation of the nanostructure progresses simultaneously and in parallel, thereby considerably improving mass production of the nanostructure and obtaining three-dimensional nanostructures depending on molecular structures.

According to the present invention, the block copolymer in step (c) may be polystyrene combined with other polymer excluding polystyrene by covalent bonds. Preferably, the block copolymer is any one selected from a group consisting of: poly(styrene-b-methyl methacrylate) (PS-b-PMMA); poly(styrene-b-butadiene) (PS-b-PB); poly(styrene-b-isoprene) (PS-b-PI); poly(styrene-b-ethylene propylene) (PS-b-PEP); poly(styrene-b-dimethylsiloxane) (PS-b-PDMS); poly(styrene-b-ethylene) (PS-b-PE); poly(styrene-b-vinylpyridine) (PS-b-P4VP); poly(isoprene-b-ferrocenyldimethylsilane) (PI-b-PES); and poly(styrene-b-ethyleneoxide) (PS-b-PEO).

According to the present invention, the neutral layer may be a self-assembly monolayer and may further comprise the step of forming a deionized (DI) water layer on the substrate.

The present invention further has a beneficial feature of forming a uniform and reproducible self-assembly monolayer by preparing a deionized (DI) water layer on a substrate then forming the self-assembly monolayer.

Preferably, the pattern cycle in above step is larger than the periodic cycle of the block copolymer, and the pattern is in linear or non-linear form.

In case where a pattern cycle on the substrate is larger than a periodic cycle of a block copolymer, it is easier to form the pattern on the substrate and it is possible to prepare desired structures at desired sites on the substrate.

In another aspect of the present invention, there is provided a cylinder type nanostructure comprising a block copolymer thin film on a patterned substrate having a neutral surface and an optional surface, prepared according to the above described method.

According to one embodiment of the present invention, a cylinder type block copolymer may be oriented in parallel to the substrate on the neutral surface, while the block copolymer is oriented perpendicular to the substrate on the optional surface.

Herein, the neutral surface is a part of a neutral layer, on which the cylinder type block copolymer is perpendicularly oriented to the substrate.

Preferably, as thickness of the block copolymer thin film decreases, degree of alignment of the nanostructure is improved.

For preparation of the nanostructure according to the present invention, a process for spin-coating the substrate with an organic block copolymer solution is required to form a block copolymer thin film. Thickness of the block copolymer thin film can be controlled depending on concentration of the organic solution and/or spin-coating speed. More particularly, as the concentration of the organic solution increases, the thickness of the thin film to be formed also increases. On the other hand, the thickness of the thin film decreases when the spin-coating speed increases.

In another aspect of the present invention, there is provided a lamella type nanostructure comprising a block copolymer thin film on a patterned substrate having a neutral surface and an optional surface, prepared according to the above described method.

According to one embodiment of the present invention, a cylinder type block copolymer may be oriented in parallel to the substrate on the neutral surface, while the block copolymer is oriented perpendicular to the substrate on the optional surface.

Preferably, as thickness of the block copolymer thin film increases, degree of alignment of the nanostructure is improved, and as width of the block copolymer thin film decreases, degree of alignment of the nanostructure is improved.

For preparation of the nanostructure according to the present invention, a substrate having a neutral layer is subjected to application of epitaxial self-assembly in order to form a patterned substrate having a neutral surface and an optional surface. Width of the neutral surface can be controlled by top-down mode lithography during the epitaxial self-assembly application. That is, the width of the neutral surface can be controlled with design of the pattern during the lithography.

The present inventive method can vary structure of a nanostructure obtained by forming a block copolymer thin film on a patterned substrate, control degree of alignment of the nanostructure by modifying properties of the surface of the patterned substrate including, for example, area of each of a neutral surface and an optional surface and/or thickness of the block copolymer thin film, and practically embody production of a block copolymer nanostructure on a patterned substrate having a pattern cycle not coincident with a periodic cycle of a block copolymer. Consequently, nanostructures with different structures can be produced by easier and more simple processes according to the present invention.

Hereinafter, the present invention will be more particularly described by the preferred examples with reference to the accompanying drawings.

Figure 3:
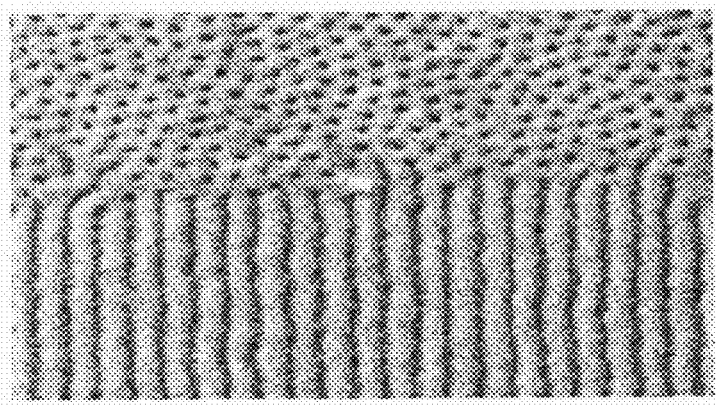
FIG. 3 illustrates structures of block copolymer thin films observed by a scanning electron microscope (SEM), each of which was prepared on a patterned substrate having a neutral surface and an optional surface.
Figure 3:
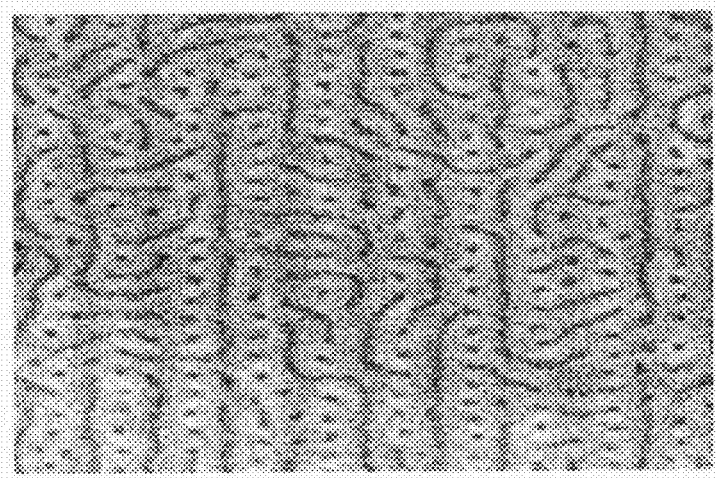
Figure 3:
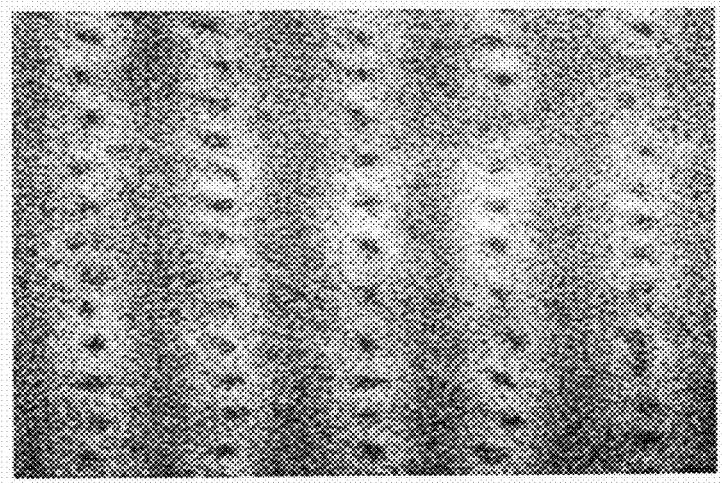
Figure 4:
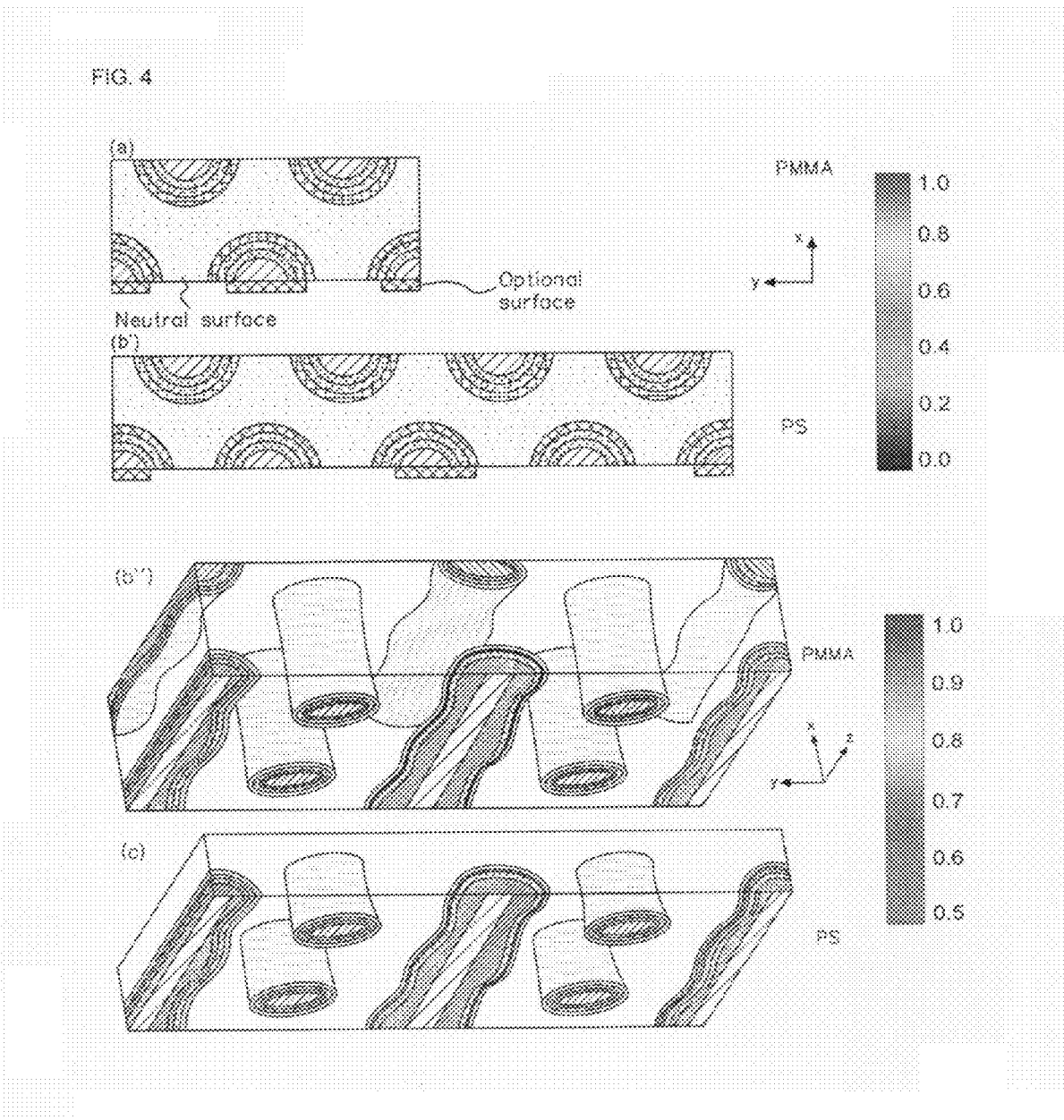
FIG. 4 illustrates structures of block copolymer thin films analyzed by self-consistent field (SCF) calculation, each of which was prepared on a patterned substrate having a neutral surface and an optional surface.

FIG. 3 and FIG. 4 illustrate results of practical experiments and results of SCF calculation and simulation for a block copolymer thin film formed on a patterned substrate having a neutral surface and an optional surface, respectively. These figures show a structure such that a double block copolymer including PS block and PMMA block is formed on a chemical surface pattern having a neutral surface and an optional surface (fraction of PS block: 0.3, N: length of a block copolymer chains, x: Flory-Huggins parameter between PS and PMMA=18.3). In the figures, Ls represents a pattern cycle, Lo represents a periodic cycle of a block copolymer, D is thickness of the block copolymer thin film, and width of the optional surface is defined to 0.5 Lo. Because of preference for a particular component as a characteristic of the optional surface, the optional surface receives PMMA block at first. SCF principle is useful for explaining restricted structure and/or self-assembly of a block copolymer in bulk state on a nano patterned surface and, especially, for analysis of three-dimensional structure in a thin film.

FIG. 3(a) and FIG. 4(a) illustrate results of practical experiments and results of SCF simulation for a block copolymer thin film structure formed on a substrate, respectively, provided that Ls=Lo=45 nm and D=40 nm. From these figures, it is found that lines are aligned in parallel on a surface of each of two layers opposite to each other.

FIG. 3(b) and FIGS. 4(b') and 4(b") illustrate results of practical experiments and results of SCF simulation for a block copolymer thin film structure formed on a substrate, respectively, provided that Ls=2.3Lo by increasing width of a neutral surface to greater than that in FIG. 3(a) and D=40 nm.

Referring to FIG. 4(b'), half-cylinders are formed in parallel on a surface of each of two layers opposite to each other. It is demonstrated that the half-cylinders formed on the lower layer are alternately positioned on a neutral surface and an optional surface.

Referring to FIG. 4(b"), cylinders perpendicular to a neutral surface are admixed with half-cylinders parallel to an optional surface. Unlike FIG. 4(a) and FIG. 4(b'), the half-cylinders formed on the upper one of the above-two layers are just above the half-cylinders formed on the lower layer. Since these parallel half-cylinders apply compressive force to each other in an x-axial direction, it is demonstrated that the perpendicular cylinders formed along the x-axial direction exhibit unevenness while the parallel half-cylinders have modification of shapes thereof. Herein, if observe the surface of the block copolymer thin film, the parallel half-cylinders on the upper layer and the perpendicular cylinders are shown as lines and dots, respectively.

Significantly reduced free energy of a system for calculation of cell sizes along z-axial direction demonstrates that a distance between adjacent perpendicular cylinders on the same column is smaller than Lo. In effect, the simulation results shown in FIG. 4(b') and FIG. 4(b") prove that three-dimensional structures of two different types of block copolymer thin films have substantially the same free energy (difference of free energies per chain is 0.03 kBT wherein kB represents Boltzmann constant, and T is absolute temperature). Briefly, because the structures shown in FIG. 4(b') and FIG. 4(b") have much the same free energy, these structures can be represented, at the same time, as well as have more stable structure in terms of energy. Accordingly, as a result of the practical experiments, a combination of different structures appeared as shown in FIG. 4(b') and FIG. 4(b").

FIG. 3(c) and FIG. 4(c) illustrate results of practical experiments and results of SCF simulation for a block copolymer thin film structure formed on a substrate, respectively, provided that Ls=2.3Lo and D=20 nm. From these figures, it is found that half-cylinders are formed in parallel only on the lower one of the above-two layers, and the parallel half-cylinders and other cylinders perpendicular to the half-cylinders are positioned by turns. The half-cylinders on the lower layer demonstrate experimental results showing that regions between dot form lines and thickness of the block copolymer thin film have been quantized by themselves.

At first, it is found from the experimental results, that black line portions between dot array regions are areas having the half-cylinders on the lower layer firstly as shown in FIG. 3(c). Secondly, it is demonstrated that a nanostructure having dot array is formed by decrease of thickness of the thin film.

From FIG. 4(c), the thin film structure has higher free energy due to the thickness (D) of the thin film being thinner than that of the thin film shown in FIG. 4(b"), so that the parallel half-cylinders on the lower layer are extended in a y-axial direction. Free energy penalty caused by the extension of the half-cylinders can be reduced by forming the perpendicular cylinders with respect to a neutral surface, thereby resulting in a structure with stably energy as shown in FIG. 4(c).

Each of FIGS. 3(b) and 3(c), and FIGS. 4(b'), 4(b") and 4(c) illustrates structure of a nanostructure which cannot be expected in case where a cycle of pattern formed on a substrate is coincident with a periodic cycle of a block copolymer. Since the nanostructure does not require to make the pattern cycle to be coincident with the periodic cycle of the block copolymer, it is obviously expected that desired structures can be formed at desired sites on the substrate. In other word, nanostructures with different structures can be prepared according to positions of pattern on the surface of the substrate.

Black circles in FIG. 3(c) indicate PMMA blocks in a block copolymer thin film, which can be selectively removed by wet etching. The block copolymer thin film having voids after removal of PMMA blocks serves as a template. Thus, metal or other materials may be deposited into the voids of the thin film or the substrate may undergo an etching process through the voids. More particularly, nano-scaled structures can be manufactured, which include, for example, nano-wire aligned in a line by depositing metal materials through the voids described above, nano-dot array with function of a plasmonic waveguide by depositing gold through the voids, etc.

Since the results of SCF simulation as described above are substantially identical to the experimental results, it is understood that a fine three-dimensional structure can be formed in the block copolymer thin film.

The present invention will be described in detail in the following examples, comparative examples and experimental examples. However, these are intended to illustrate the invention as preferred embodiments of the present invention without limitation of the scope of the present invention and, it will be understood by those skilled in the art that various modifications and variations may be made by addition or substitution of constructional elements of the present invention.

Example 1

Preparation of a Cylinder Type Nanostructure by Self-Assembly of a Block Copolymer on Surface Pattern Having a Cycle Not Coincident with a Periodic Cycle of the Block Copolymer After placing a Si substrate in a solution containing sulfuric acid $H_2SO_4$ and hydrogen peroxide $H_2O_2$ in a ratio of 7:3 and cleaning the substrate at 110° C. for 30 minutes, the treated substrate was washed using DI water then dried. Spin-coating the dried substrate with DI water, a DI water layer was formed on the substrate. The Si substrate with DI water layer was immersed in 0.1 vol % phenylethyltrichlorosilane (PETS) in toluene for 1 hour, followed by washing the wet substrate with toluene then ethanol in order to form a self-assembly monolayer over the substrate.

The self-assembly monolayer was treated by EUVIL to form a photoresist pattern having a cycle (Ls) of about 100 nm. After transferring the photoresist pattern to the self-assembly monolayer by X-ray irradiation, the photoresist residue remaining on the substrate was washed out so as to produce a patterned Si substrate having the self-assembly monolayer.

Thereafter, after spin-coating the patterned Si substrate with a polystyrene-block-methyl methacrylate (PS-b-PMMA) solution with concentration of about 1 to 1.5 wt. %, which was prepared by dissolving PS-b-PMMA having a periodic cycle (Lo) of 45 nm in toluene, at a spin-coating speed of about 2000 to 5000 rpm, the coated substrate was heat treated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 46,100 for PS and 21,000 for PMMA. Fraction of PMMA was about 0.3.

Figure 5:
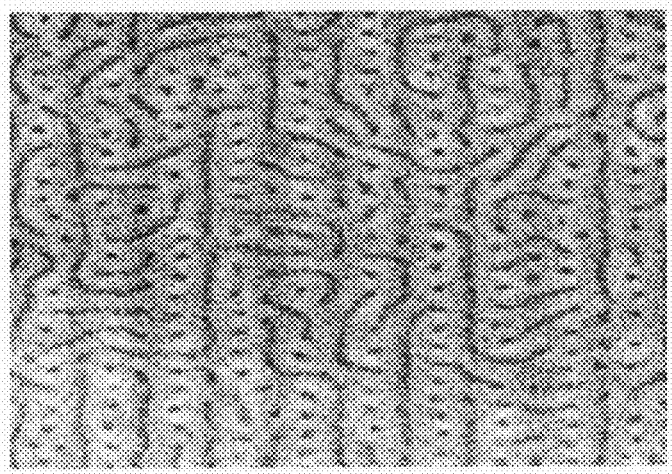
FIG. 5 is a plan view illustrating structure of a cylinder type nanostructure prepared by a method according to the present invention observed by SEM.
Figure 6:
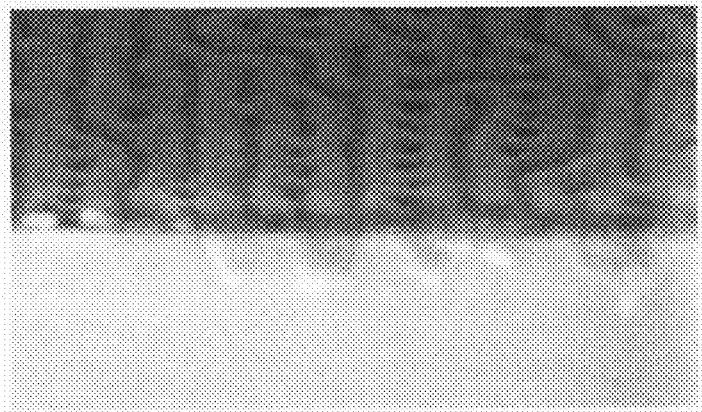
FIG. 6 is a cross-sectional view illustrating structure of a cylinder type nanostructure prepared by a method according to the present invention observed by SEM.

As a result of observing the produced PS-b-PMMA nanostructure by SEM, it was found that the nanostructure is a nanostructure having cylindrical structure (see FIG. 5 and FIG. 6).

Example 2

Degree of Alignment of a Cylinder Type Nanostructure Dependent on Thickness of Thin Film After placing a Si substrate in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with DI water, a DI water layer was formed on the substrate. The Si substrate with DI water layer was immersed in 0.1 vol % PETS in toluene for 1 hour, followed by washing the wet substrate with toluene then ethanol to form a self-assembly monolayer over the substrate.

The self-assembly monolayer was treated by EUVIL to form a photoresist pattern having Ls of about 100 nm. After transferring the photoresist pattern to the self-assembly monolayer by X-ray irradiation, the photoresist residue remaining on the substrate was washed out to produce a patterned Si substrate having the self-assembly monolayer.

Thereafter, after spin-coating the patterned Si substrate with a PS-b-PMMA solution with concentration of about 1 to 1.5 wt. %, which was prepared by dissolving PS-b-PMMA having Lo of 45 nm in toluene, at a spin-coating speed of about 2000 to 5000 rpm, the coated substrate was heattreated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 46,100 for PS and 21,000 for PMMA. Fraction of PMMA was about 0.3.

From SEM observation, it was found that a cylinder type nanostructure was produced as the final product, and thickness of a PS-b-PMMA thin film was altered depending on concentration of the PS-b-PMMA solution. More particularly, the thickness of the PS-b-PMMA thin film increased as the concentration of the PS-b-PMMA solution increased.

Alternatively, it was found that degree of alignment of the cylinder type nanostructure is varied by thickness of the PS-b-PMMA thin film.

Consequently, with regard to a cylinder type nanostructure prepared using self-assembly of a block copolymer having a periodic cycle not coincident with a pattern cycle on a patterned substrate, it was understood that, as thickness of a block copolymer thin film formed on the substrate decreases, the degree of alignment of the cylinder type nanostructure is improved.

Example 3

Preparation of a Lamella Type Nanostructure by Self-Assembly of a Block Copolymer on Surface Pattern Having a Cycle Not Coincident with a Periodic Cycle of the Block Copolymer After blending 2,2'-azobis[2-methyl-N-(2-hydroxyethyl)-propionamide] as a free radical initiator, styrene and methyl methacrylate as monomers, and 2,4-diphenyl-4-methyl-1-pentene as a chain transfer agent (CTA) together and bulk polymerization of the blend at 70° C., the prepared polymer was washed using DI water to remove unreacted portion of 2,2'-azobis[2-methyl-N-(2-hydroxyethyl)-propionamide]. The resulting reaction product was precipitated in methanol then dried to obtain a synthesized PS-r-PMMA polymer brush.

After placing a Si substrate in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with a 2.5 wt. % PS-r-PMMA brush solution which was prepared by dissolving the above synthesized PS-r-PMMA brush in toluene, the coated substrate was subjected to sequential processes including, pre-baking at 110° C. for 1 minute, heat treatment in a vacuum oven at 160° C. for 3 days and washing with toluene to form a final PS-r-PMMA brush layer with thickness ranging from 5 to 6 nm.

The PS-r-PMMA brush layer was treated by electron beam lithography to form a photoresist pattern having Ls of about 100 nm. After transferring the photoresist pattern to the PS-r-PMMA brush layer by $O_2$ plasma irradiation, the photoresist residue remaining on the substrate was washed out to produce a patterned Si substrate having the PS-r-PMMA brush layer.

Thereafter, after spin-coating the patterned Si substrate with a PS-b-PMMA solution with concentration of about 1 to 3 wt. %, which was prepared by dissolving PS-b-PMMA having Lo of 45 nm in toluene, at a spin-coating speed of about 2000 to 5000 rpm, the coated substrate was heat treated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 52,000 for PS and 52,000 for PMMA. Fraction of PMMA was about 0.5.

Figure 7:
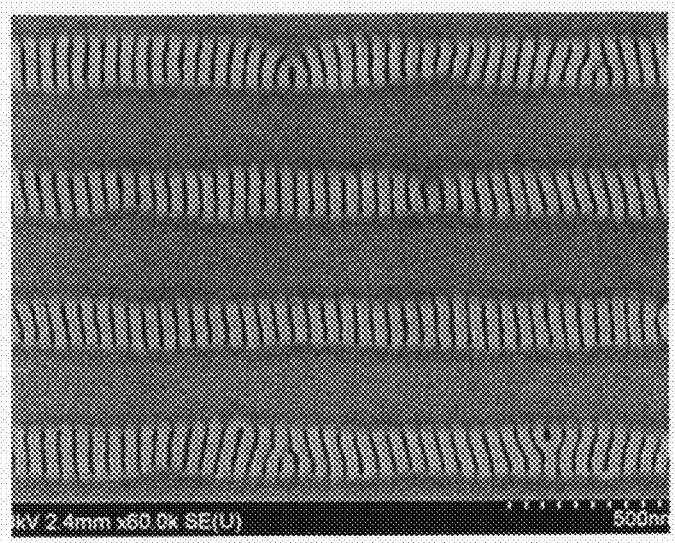
FIG. 7 is a plan view illustrating structure of a lamella type nanostructure prepared according to the present invention observed by SEM.

As a result of observing the produced PS-b-PMMA nanostructure by SEM, it was found that the nanostructure is a nanostructure having lamellar structure (see FIG. 7).

Example 4

Degree of Alignment of a Lamella Type Nanostructure Dependent on Thickness of Thin Film After blending 2,2'-azobis[2-methyl-N-(2-hydroxyethyl)-propionamide] as a free radical initiator, styrene and methyl methacrylate as monomers, and 2,4-diphenyl-4-methyl-1-pentene as CTA together and bulk polymerization of the blend at 70° C., the prepared polymer was washed using DI water to remove unreacted portion of 2,2'-azobis[2-methyl-N-(2-hydroxyethyl)-propionamide]. The resulting reaction product was precipitated in methanol then dried to obtain a synthesized PS-r-PMMA brush.

After placing each of three Si substrates in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with a 2.5 wt. % PS-r-PMMA brush solution which was prepared by dissolving the above synthesized PS-r-PMMA brush in toluene, the coated substrate was subjected to sequential processes including, pre-baking at 110° C. for 1 minute, heat treatment in a vacuum oven at 160° C. for 3 days and washing with toluene to form a final PS-r-PMMA brush layer with thickness ranging from 5 to 6 nm.

The PS-r-PMMA brush layer was treated by electron beam lithography to form a photoresist pattern having Ls of about 300 nm. After transferring the photoresist pattern to the PS-r-PMMA brush layer by $O_2$ plasma irradiation, the photoresist residue remaining on the substrate was washed out to produce a patterned Si substrate having the PS-r-PMMA brush layer.

Thereafter, spin-coating each of the patterned three Si substrates with a PS-b-PMMA solution with concentration of about 1 to 3 wt. %, which was prepared by dissolving PS-b-PMMA having Lo of 45 nm in toluene, at a spin-coating speed of about 2000 to 5000 rpm, the coated substrate was heat treated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 52,000 for PS and 52,000 for PMMA. Fraction of PMMA was about 0.5.

From SEM observation, it was found that a lamella type nanostructure was produced as the final product, and thickness of a PS-b-PMMA thin film was altered depending on spin-coating speed. More particularly, the thickness of the PS-b-PMMA thin film decreased as the spin-coating speed increased.

Figure 8:
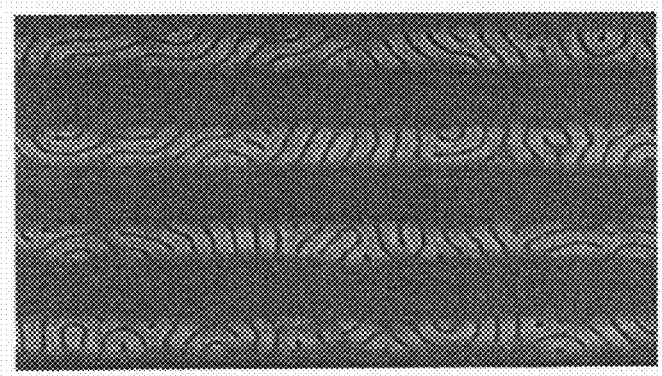
FIG. 8 illustrates degree of alignment varied dependent on thickness of a block copolymer thin film in a lamella type nanostructure, which was prepared by a method according to the present invention.
Figure 8:
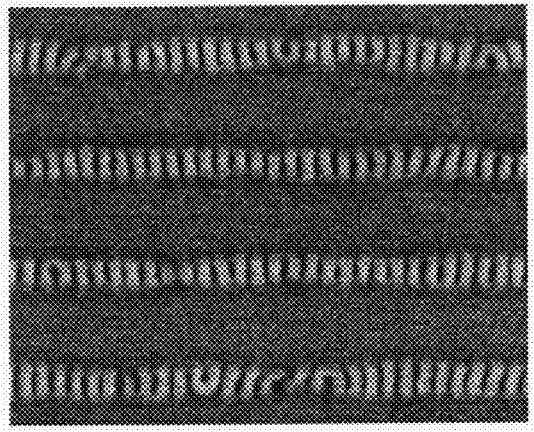
Figure 8:
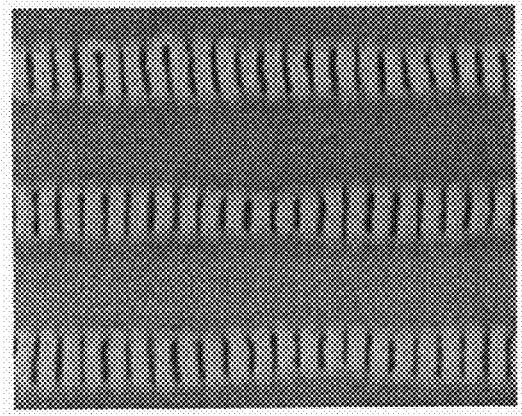

Alternatively, SEM observation demonstrated that degree of alignment of the nanostructure is varied by thickness of the PS-b-PMMA thin film (see FIG. 8).

Consequently, with regard to a lamella type nanostructure prepared using self-assembly of a block copolymer having a periodic cycle not coincident with a pattern cycle on a patterned substrate, it was understood that, as thickness of a block copolymer thin film formed on the substrate increases, the degree of alignment of the lamella type nanostructure is improved.

Example 5

Degree of Alignment of a Lamella Type Nanostructure Dependent on Width of Neutral Surface After blending 2,2'-azobis[2-methyl-N-(2-hydroxyethyl)-propionamide] as a free radical initiator, styrene and methyl methacrylate as monomers, and 2,4-diphenyl-4-methyl-1-pentene as CTA together and bulk polymerization of the blend at 70° C., the prepared polymer was washed using DI water to remove unreacted portion of 2,2'-azobis[2-methyl-N-(2-hydroxyethyl)-propionamide]. The resulting reaction product was precipitated in methanol then dried to obtain a synthesized PS-r-PMMA brush.

After placing each of three Si substrates in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with a 2.5 wt. % PS-r-PMMA brush solution which was prepared by dissolving the above synthesized PS-r-PMMA brush in toluene, the coated substrate was subjected to sequential processes including, pre-baking at 110° C. for 1 minute, heat treatment in a vacuum oven at 160° C. for 3 days and washing with toluene to form a final PS-r-PMMA brush layer with thickness ranging from 5 to 6 nm.

The PS-r-PMMA brush layer was treated by electron beam lithography to form a photoresist pattern with Ls of about 300 to 400 nm, the pattern being defined by design of pattern for altering width of a neutral area. After transferring the photoresist pattern to the PS-r-PMMA brush layer by $O_2$ plasma irradiation, the photoresist residue remaining on the substrate was washed out to produce a patterned Si substrate having the PS-r-PMMA brush layer. As a result of SEM observation, it was found that each of the three Si substrates after patterning comprised a neutral surface and an optional surface and the neutral surface of each of the substrates had different width.

Thereafter, spin-coating each of the patterned three Si substrates with a PS-b-PMMA solution with concentration of about 3 wt. %, which was prepared by dissolving PS-b-PMMA having Lo of 48 nm in toluene, at spin-coating speeds of 2000 rpm, 3000 rpm and 4000 rpm, respectively, each of the coated substrates was heat treated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 52,000 for PS and 52,000 for PMMA. Fraction of PMMA was about 0.5.

Figure 9:
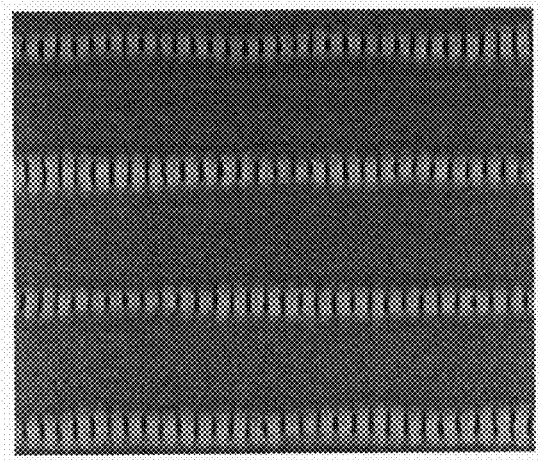
FIG. 9 illustrates degree of alignment varied dependent on width of a neutral surface in a lamella type nanostructure, which was prepared by a method according to the present invention.
Figure 9:
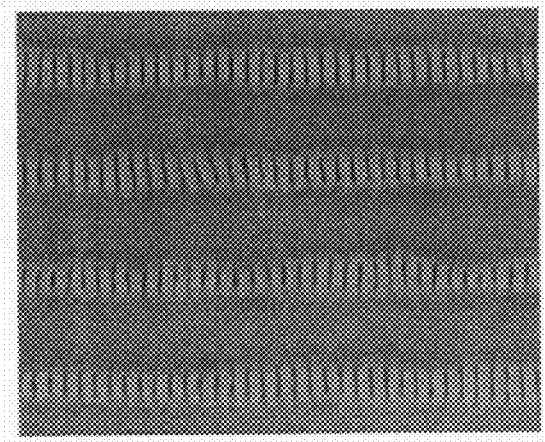
Figure 9:
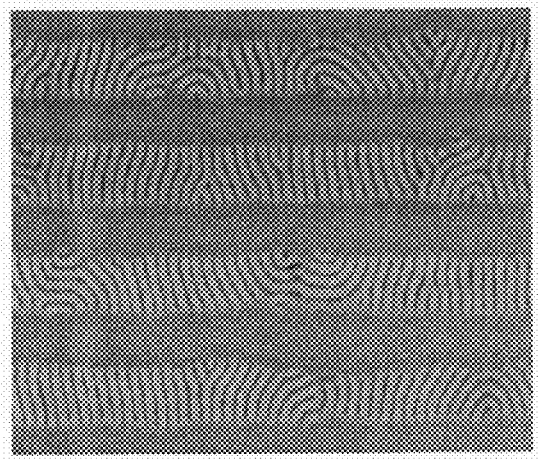

From SEM observation, it was found that a lamella type nanostructure was produced as the final product, a lamella oriented perpendicular to the substrate was vertically aligned against the longer axial direction of linear pattern in the pattern, that is, aligned in the shorter axial direction with respect of the neutral surface of the patterned substrate, and the above alignment of the lamella related to the width of the neutral surface (see FIG. 9).

Consequently, with regard to a lamella type nanostructure, it was understood that degree of alignment of the lamella type nanostructure is improved as width of a neutral surface in a substrate having the neutral surface and an optional surface decreases.

Example 6

Preparation of a Lamella Type Nanostructure on Each of Substrates with Different Designs of Patterns After blending 2,2'-azobis[2-methyl-N-(2-hydroxyethyl)-propionamide] as a free radical initiator, styrene and methyl methacrylate as monomers, and 2,4-diphenyl-4-methyl-1-pentene as CTA together and bulk polymerization of the blend at 70° C., the prepared polymer was washed using DI water to remove unreacted portion of 2,2'-azobis[2-methyl-N-(2-hydroxyethyl)-propionamide]. The resulting reaction product was precipitated in methanol then dried to obtain a synthesized PS-r-PMMA brush.

After placing each of three Si substrates in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with a 2.5 wt. % PS-r-PMMA brush solution which was prepared by dissolving the above synthesized PS-r-PMMA brush in toluene, the coated substrate was subjected to sequential processes including, pre-baking at 110° C. for 1 minute, heat treatment in a vacuum oven at 160° C. for 3 days and washing with toluene to form a final PS-r-PMMA brush layer with thickness ranging from 5 to 6 nm.

The PS-r-PMMA brush layer was treated by electron beam lithography to form a photoresist pattern with Ls of about 500 nm, the pattern being defined by design of pattern for forming curvature in a neutral area. After transferring the photoresist pattern to the PS-r-PMMA brush layer by $O_2$ plasma irradiation, the photoresist residue remaining on the substrate was washed out to produce a patterned Si substrate having the PS-r-PMMA brush layer.

Figure 10:
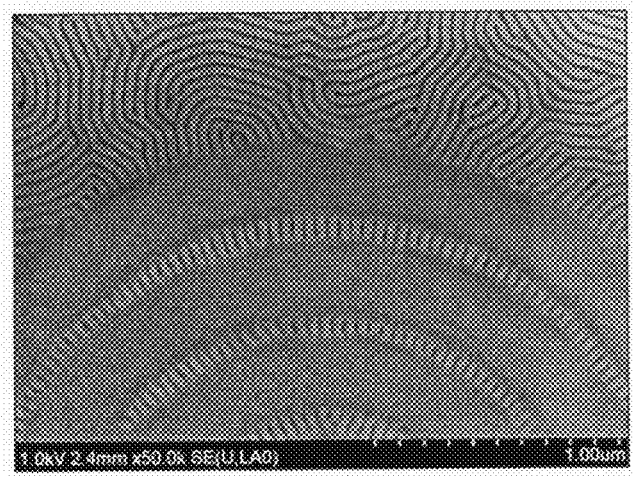
FIG. 10 is a plan view illustrating structure of a lamella type nanostructure observed by SEM, which was prepared on a substrate having non-linear surface pattern.

As a result of SEM observation, it was found that each of the three Si substrates after patterning comprised a neutral surface and an optional surface, and the neutral surface of each of the substrates had lamella aligned thereon along the curvature of the neutral surface pattern (see FIG. 10).

Experimental Example 1

Preparation of a Cylinder Type Nanostructure on a Patterned Substrate Having a Cycle Coincident with a Periodic Cycle of the Block Copolymer After placing a Si substrate in a solution containing $H_2SO_4$ and $H_2O_2$ in a ratio of 7:3 and cleaning the substrate at 110° C. for 30 minutes, the treated substrate was washed using DI water then dried. Spin-coating the dried substrate with DI water, a DI water layer was formed on the substrate. The Si substrate with DI water layer was immersed in 0.1 vol % PETS in toluene for 1 hour, followed by washing the wet substrate with toluene then ethanol in order to form a self-assembly monolayer over the substrate.

The self-assembly monolayer was treated by EUVIL to form two photoresist patterns having Ls of about 45 nm and 100 nm, respectively. After transferring each of the photoresist patterns to the self-assembly monolayer by X-ray irradiation, the photoresist residue remaining on the substrate was washed out so as to produce a patterned Si substrate having the self-assembly monolayer.

Thereafter, after spin-coating the patterned Si substrate with a PS-b-PMMA solution with concentration of about 1 to 1.5 wt. %, which was prepared by dissolving PS-b-PMMA having Lo of 45 nm in toluene, at a spin-coating speed of about 2000 to 5000 rpm, the coated substrate was heat treated in a vacuum oven at 190° C. for 3 days to induce self-assembly of PS-b-PMMA, thereby producing a PS-b-PMMA nanostructure. PS-b-PMMA was used as a block copolymer and each of blocks in the block copolymer had molecular weight of 46,100 for PS and 21,000 for PMMA. Fraction of PMMA was about 0.3.

Figure 11:
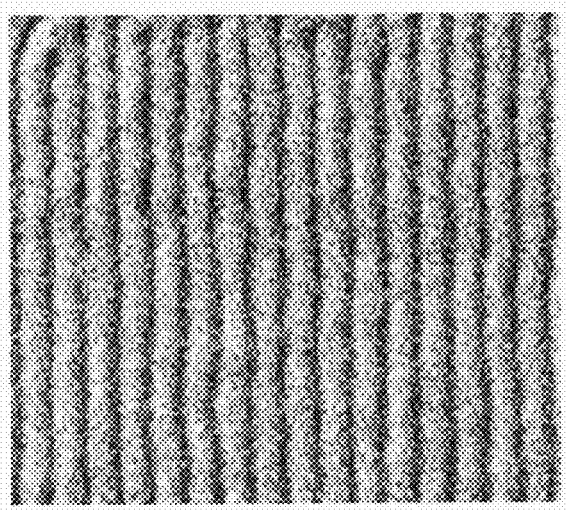
FIG. 11 illustrates a cylinder type block copolymer formed on a substrate in a case where the substrate has surface pattern with a cycle substantially coincident with a periodic cycle of a block copolymer.

As a result of observing the produced PS-b-PMMA nanostructure by SEM, it was found that the nanostructure is a nanostructure having cylindrical structure (see FIG. 11).

Comparative Example 1

Comparison Between Cylinder Type Nanostructures on Patterned Substrates Having a Cycle Coincident with and Another Cycle Not Coincident with a Periodic Cycle of the Block Copolymer, Respectively As shown in Table 1, a cylinder type nanostructure formed in case where a periodic cycle of each of block copolymers prepared in Example 1 and Experimental Example 1 is coincident with a pattern cycle of a substrate, was compared with another cylinder type nanostructure formed in case where the above periodic cycle of the block copolymer is not coincident with the pattern cycle of the substrate. The cylinder type nanostructure prepared in Example 1 revealed a structure of forming parallel cylinders and vertical cylinders with respect to the substrate by turns. In contrast, the cylinder type nanostructure prepared in Experimental Example 1 had a structure of only parallel cylinders with respect to the substrate. For the nanostructure prepared in Example 1, the cylinders perpendicular to the substrate are formed in a neutral surface of the patterned substrate. Altering site of the neutral surface to regulate positions of the vertical cylinders, the structure of the nanostructure can be controlled.

TABLE 1

| | Ls | Lo | D | Form of cylinder type nanostructure |
|---|---|---|---|---|
| Example 1 | 100 nm | 45 nm | 40 nm | Form of parallel cylinders and vertical cylinders with respect to substrate by turns |
| Experimental Example 1 | 45 nm | 45 nm | 40 nm | Form of parallel cylinder with respect to substrate |

According to the present invention, a nanostructure can be produced by more simple processes without making a pattern cycle to be coincident with a periodic cycle of a block copolymer in production of a block copolymer nanostructure on a patterned substrate. Further, nanostructures with a variety of structures can be embodied by regulating compositional ratio and/or fraction of each of blocks in the block copolymer while degree of alignment of the nanostructure is desirably controlled. Accordingly, the present invention is effectively used in simple production of nano-scaled structures such as nano-wire, nano-dot array, etc. and in industrial applications with a variety of uses thereof.

While the present invention has been described with reference to the preferred examples, it will be understood by those skilled in the art that various modifications and variations may be made therein without departing from the scope of the present invention as defined by the appended claims.

What is claimed is:

1. A method for preparation of a block copolymer nanostructure by self-assembly comprising:
   (a) forming a neutral layer on a substrate;
   (b) patterning the substrate having the neutral layer such that the patterned substrate has a pattern cycle 6.25-8.3 times larger than a periodic cycle of a block copolymer, wherein the pattern cycle is 300-400 nm;
   (c) forming a block copolymer thin film on the patterned substrate; and
   (d) heat treating the block copolymer to induce self-assembly thereof and to obtain a completed nanostructure.

2. The method according to claim 1, wherein the neutral layer in step (a) includes an organic monolayer.

3. The method according to claim 2, wherein the organic monolayer is a self-assembly monolayer or a polymer brush layer.

4. The method according to claim 3, wherein the self-assembly monolayer includes any one selected from a group consisting of: phenethyltrichlorosilane (PETCS); phenyltrichlorosilane (PTCS); benzyltrichlorosilane (BZTCS); tolyltrichlorosilane (TICS); 2-[(trimethoxysilyl)ethyl]-2-pyridine (PYRTMS); 4-biphenylyltrimethoxysilane (BPTMS); octadecyltrichlorosilane (OTS); 1-naphthyltrimethoxysilane (NAPTMS); 1-[(trimethoxysilyl)methyl]-naphthalene (MNATMS); and (9-methylanthracenyl)trimethoxysilane (MANTMS).

5. The method according to claim 3, wherein the polymer brush layer is a polystyrene-random-methyl methacrylate (PS-r-PMMA) brush layer.

6. The method according to claim 1, wherein the patterning in step (b) is performed by top-down mode lithography.

7. The method according to claim 1, wherein a surface of the patterned substrate in step (b) includes a neutral surface and an optional surface.

8. The method according to claim 1, wherein the block copolymer in step (c) is polystyrene combined with other polymer excluding polystyrene by covalent bonds.

9. The method according to claim 8, wherein a relative ratio of polystyrene to other polymer excluding polystyrene in the block copolymer is defined by (0.70-0.65):(0.30-0.35) or (0.30-0.35):(0.70-0.65).

10. The method according to claim 8, wherein a relative ratio of polystyrene to other polymer excluding polystyrene in the block copolymer is defined by 0.5:0.5.

11. The method according to claim 8, wherein a relative ratio of polystyrene to other polymer excluding polystyrene in the block copolymer is defined by (0.82-0.77):(0.18-0.23) or (0.18-0.23):(0.82-0.77).

12. The method according to claim 8, wherein a relative ratio of polystyrene to other polymer excluding polystyrene in the block copolymer is defined by (0.65-0.60):(0.35-0.40) or (0.35-0.40):(0.65-0.60).

13. The method according to claim 8, wherein the block copolymer is any one selected from a group consisting of: poly(styrene-b-methylmethacrylate) (PS-b-PMMA); poly(styrene-b-butadiene) (PS-b-PB); poly(styrene-b-isoprene) (PS-b-PI); poly(styrene-b-ethylene propylene) (PS-b-PEP); poly(styrene-b-dimethylsiloxane) (PS-b-PDMS); poly(styrene-b-ethylene) (PS-b-PE); poly(styrene-b-vinylpyridine) (PS-b-P4VP); poly(isoprene-b-ferrocenyldimethylsilane) (PI-b-PES); and poly(styrene-b-ethyleneoxide) (PS-b-PEO).

14. The method according to claim 1, wherein the neutral layer is a self-assembly monolayer and further comprising the step of forming a deionized (DI) water layer on the substrate.

15. The method according to claim 1, wherein the pattern in step (b) is in linear or non-linear form.

16. A cylindrical nanostructure comprising a block copolymer thin film on a patterned substrate having a neutral surface and an optional surface, wherein a pattern cycle is larger than a periodic cycle of the block copolymer,
   wherein the nanostructure is prepared by self-assembly comprising:
   (a) forming a neutral layer on a substrate;
   (b) patterning the substrate having the neutral layer such that the patterned substrate has the pattern cycle 6.25-8.3 times larger than the periodic cycle of the block copolymer wherein the pattern cycle is 300-400 nm;
   (c) forming a block copolymer thin film on the patterned substrate; and
   (d) heat treating the block copolymer to induce self-assembly thereof and to obtain a completed nanostructure,
   wherein the block copolymer in step (c) is polystyrene combined with other polymer excluding polystyrene, by covalent bonds in the relative ratio of polystyrene to said other polymer excluding polystyrene being (0.70-0.65):(0.30-0.35) or (0.30-0.35):(0.70-0.65).

17. The nanostructure according to claim 16, wherein a cylindrical block copolymer is oriented in parallel to the substrate on the neutral surface, while the block copolymer is oriented perpendicular to the substrate on the optional surface.

18. The nanostructure according to claim 16, wherein, as thickness of the block copolymer thin film decreases, degree of alignment of the nanostructure is improved.

19. A lamellar nanostructure comprising a block copolymer thin film on a patterned substrate having a neutral surface and an optional surface, wherein a pattern cycle is larger than a periodic cycle of the block copolymer,
   wherein the nanostructure is prepared by self-assembly comprising:
   (a) forming a neutral layer on a substrate;
   (b) patterning the substrate having the neutral layer such that the patterned substrate has the pattern cycle 6.25-

8.3 times larger than the periodic cycle of the block copolymer, wherein the pattern cycle is 300-400 nm;

(c) forming a block copolymer thin film on the patterned substrate; and (d) heat treating the block copolymer to induce self-assembly thereof and to obtain a completed nanostructure, wherein the block copolymer in step (c) is polystyrene combined with other polymer excluding polystyrene, by covalent bonds in the relative ratio of polystyrene to said other polymer excluding polystyrene being (0.5:0.5).

20. The nanostructure according to claim 19, wherein a lamellar block copolymer is oriented in parallel to the substrate on the neutral surface, while the block copolymer is oriented perpendicular to the substrate on the optional surface.

21. The nanostructure according to claim 19, wherein, as thickness of the block copolymer thin film increases, degree of alignment of the nanostructure is improved.

22. The nanostructure according to claim 19, wherein, as width of the block copolymer thin film decreases, degree of alignment of the nanostructure is improved.

23. A spherical nanostructure comprising a block copolymer thin film on a patterned substrate having a neutral surface and an optional surface, wherein a pattern cycle is larger than a periodic cycle of the block copolymer, wherein the nanostructure is prepared by self-assembly comprising:

(a) forming a neutral layer on a substrate;

(b) patterning the substrate having the neutral layer such that the patterned substrate has the pattern cycle 6.25-8.3 nm larger than the periodic cycle of the block copolymer, wherein the pattern cycle is 300-400 nm;

(c) forming a block copolymer thin film on the patterned substrate; and (d) heat treating the block copolymer to induce self-assembly thereof and to obtain a completed nanostructure, wherein the block copolymer in step (c) is polystyrene combined with other polymer excluding polystyrene, by covalent bonds in the relative ratio of polystyrene to said other polymer excluding polystyrene being (0.82-0.77):(0.18-0.23) or (0.18-0.23):(0.82-0.77).

24. A gyroid nanostructure comprising a block copolymer thin film on a patterned substrate having a neutral surface and an optional surface, wherein a pattern cycle is larger than a periodic cycle of the block copolymer, wherein the nanostructure is prepared by self-assembly comprising:

(a) forming a neutral layer on a substrate;

(b) patterning the substrate having the neutral layer such that the patterned substrate has the pattern cycle 6.25-8.3 nm times larger than the periodic cycle of the block copolymer, wherein the pattern cycle is 300-400 nm;

(c) forming a block copolymer thin film on the patterned substrate; and (d) heat treating the block copolymer to induce self-assembly thereof and to obtain a completed nanostructure, wherein the block copolymer in step (c) is polystyrene combined with other polymer excluding polystyrene, by covalent bonds in the relative ratio of polystyrene to said other polymer excluding polystyrene being (0.65-0.60):(0.35-0.40) or (0.35-0.40):(0.65-0.60).

* * * * *

UNITED STATES PATENT AND TRADEMARK OFFICE
CERTIFICATE OF CORRECTION

PATENT NO. : 9,005,756 B2  
APPLICATION NO. : 12/081172  
DATED : April 14, 2015  
INVENTOR(S) : Sang Ouk Kim et al.

Page 1 of 1

It is certified that error appears in the above-identified patent and that said Letters Patent is hereby corrected as shown below:

IN THE CLAIMS

Claim 4, Column 17, Line 51: replace "TICS" with --TTCS--  
Claim 23, Column 19, Line 26: replace "islarger" with --is larger--

Signed and Sealed this  
Sixth Day of October, 2015

Michelle K. Lee  
*Director of the United States Patent and Trademark Office*